United States Patent [19]
Jones

[11] 4,191,108
[45] Mar. 4, 1980

[54] TIE DOWN ANCHOR

[76] Inventor: Jeffery C. Jones, Rte. 2, Dunlap, Tenn. 37327

[21] Appl. No.: 883,674

[22] Filed: Mar. 6, 1978

[51] Int. Cl.² .................. A62B 35/00; B60P 7/06; B61D 45/00; F16B 13/08
[52] U.S. Cl. .................. 410/110; 24/230 R; 410/113; 410/116; 248/503; 296/43
[58] Field of Search ............ 24/206, 230 R; 105/466, 105/475, 476, 477, 478, 479, 480, 481, 482, 483, 484, 485, 486, 487, 488, 489, 473; 280/179 A; 248/500, 501, 503; 296/43

[56] References Cited
U.S. PATENT DOCUMENTS

| 848,972 | 4/1907 | Costello | 24/230 R |
| 1,326,055 | 12/1919 | Hirsch | 24/230 R |
| 2,685,848 | 8/1954 | Meighan et al. | 105/475 |
| 2,905,992 | 9/1959 | Smick | 24/230 R X |
| 3,161,149 | 12/1964 | Monus | 105/483 |
| 3,259,353 | 7/1966 | Webb | 105/485 |
| 3,421,726 | 1/1969 | Getter | 105/475 |
| 3,595,125 | 7/1971 | Jacobs | 105/475 X |
| 3,841,660 | 10/1974 | Clark | 105/473 X |

Primary Examiner—Joseph F. Peters, Jr.
Assistant Examiner—Howard Beltran

[57] ABSTRACT

A tie-down anchor for use with a pick-up truck stake opening and which device has side portions joined at one end capable of being removably mounted in the stake opening. Projections are secured to the side portions to engage the stake hole opening to prevent removal of the device. Stop members are also secured to each portion to limit the distance the side portions can be inserted in the stake hole. An extension is associated with at least one of the side portions to permit a rope, antenna or other attachments thereto.

5 Claims, 8 Drawing Figures

U.S. Patent  Mar. 4, 1980  4,191,108
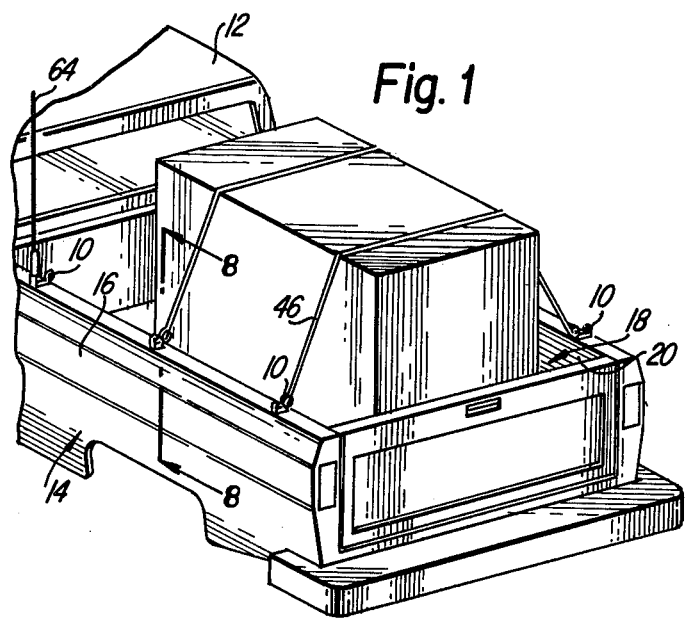
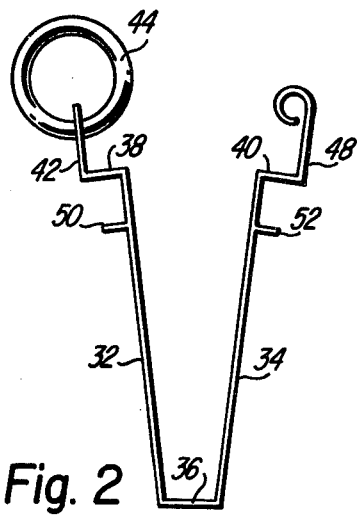
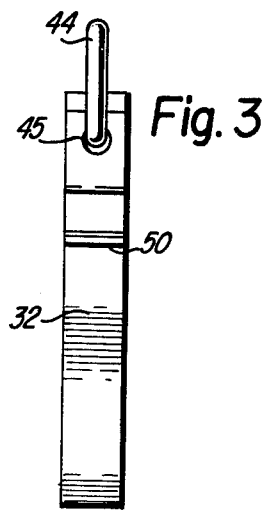
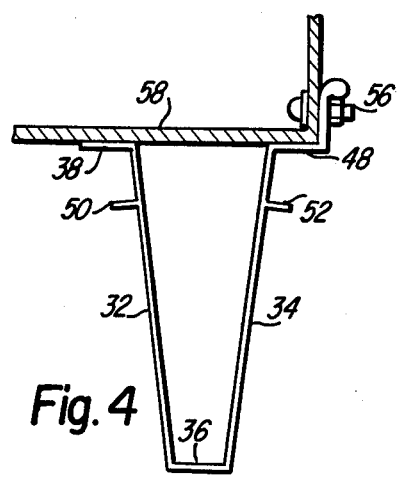
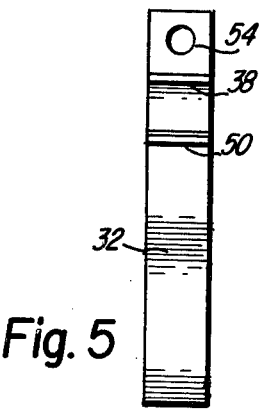
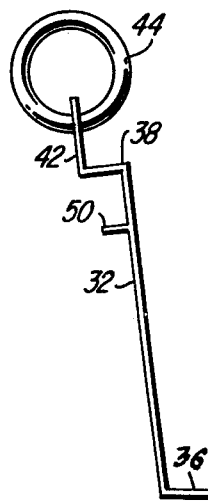
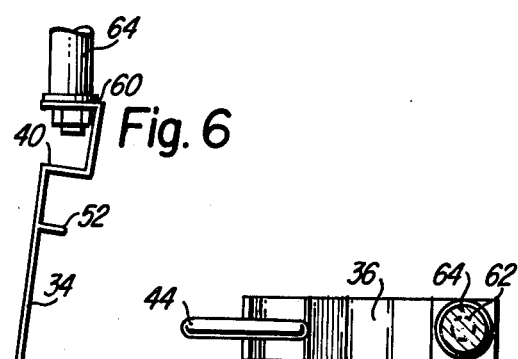
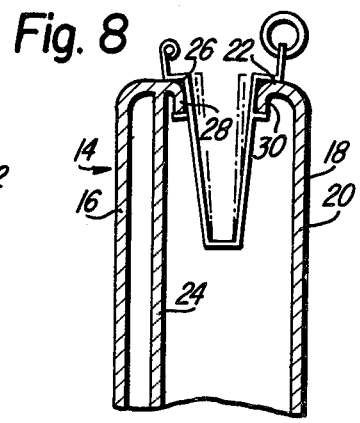

TIE DOWN ANCHOR

BACKGROUND OF THE INVENTION

1. Field of the Invention

This invention relates to tie-down devices and more particularly to a device which can be removably mounted in a pick-up truck body stake hole and to which can be attached rope and the like.

2. Description of Prior Art and Objects

The rectangular stake openings found in the dual walled sides adjacent the flat bed of a conventional pick-up truck are normally utilized to receive and retain upright stakes along the sides to confine and hold lading in position with rope tied to the stakes. If the lading is high, it is difficult to secure the rope to the stakes. Because there are normally six to eight stake holes on the average truck body there is a necessity for a simply constructed, inexpensive and easily operated device which can be quickly inserted and removed from the stake holes and to which rope etc. can be attached. The U.S. Pat. to Webb No. 3,259,353 discloses a device having a hook which can be inserted in truck body stake holes to which rope can be attached, however, the device is constructed of several interconnected, pivoting spring biased parts some of which are welded and shaped to engage only one side of the stake hole or structural elements not present in all pick-up trucks. The Webb device, due to its multipart construction, is expensive to fabricate. The U.S. Pat. to Clark No. 3,841,660 discloses a tie-down device having a threaded shank which engages elements on either side of the stake hole and which elements when drawn together hold the device firm. The Clark device is thus not easily and quickly insertable and removable from the stake hole.

It is, therefore, the primary object of the present invention to provide a device which can be utilized in place of the stake normally present to provide a point for fastening rope or mounting other attachments.

It is another object of the present invention to provide a tie-down and mounting device which can be quickly mounted and removed in stake openings in pick-up truck bodies.

It is a still further object of the present invention to provide a tie-down and mounting device which is of simple and economical construction, does not rattle, and which can be used in pick-up trucks of conventional construction.

Other objects together with the foregoing are attained in the embodiment of the invention described in the accompanying description and illustrated in the accompanying drawing, in which:

FIG. 1 is a perspective view of a part of the bed portion of a conventional pick-up truck with the device of the invention in its semi-installed position;

FIG. 2 is an elevational view of one embodiment of the device of the invention having a ring for rope attachment;

FIG. 3 is a side view of the embodiment of FIG. 2;

FIG. 4 is a elevational view of another embodiment of the device having a recess on the end thereof for mounting campers, pan-type tops and the like;

FIG. 5 is a side view of the embodiment of FIG. 4;

FIG. 6 is an elevational view of a further embodiment of the device having both a ring for rope attachment and a recess for mounting an antenna;

FIG. 7 is a plan view of the embodiment of FIG. 6; and

FIG. 8 is a transverse cross-sectional view of the embodiment of FIG. 2 in position in a stake hole of a pick-up truck body taken along the lines 8—8 of FIG. 1.

DESCRIPTION OF THE PREFERRED EMBODIMENTS

The tie-down and mounting device of the invention shown generally at 10 is designed to be used in connection with a pick-up truck body 12. The body 12 consists generally of a hollow exterior side 14 in the form of a sheet metal panel 16 and an interior side 18 in the form of a sheet metal panel 20. The vertically extending panels 16, 20 are connected at their upper ends by a horizontally extending flange 22. A reinforcing plate 24 is also generally provided a spaced apart distance from the exterior panel 16. The side 14 and 18 as well as the flange 22 together form a hollow side wall for the bed of the truck.

On the horizontally extending flange 22, stake openings 26 are cut therethrough at appropriate locations along the flange 22 on both sides of the pick-up truck body 12. The stake openings 26 are generally rectangular and have depending flanges 28, 30 extending a distance parallel to the panels 16, 20 respectfully. A stake of wood (not shown) is usually introduced into the opening 26 to a position between the reinforcing plate 24 and the side panel 20. Cross members of wood (also not shown) can be secured to a row of the wooden stakes on each side to thereby effectively extend the height of the sides. This arrangement is satisfactory if the purpose of the stakes is to merely contain a load higher than the metal sides of the truck. However, if it is desired to secure a relatively high standing load by rope or the like, such rope cannot be tied to the wooden stakes as the stakes tend to work free and come out of the opening 26 particularly when the truck is underway.

The device 10 of the present invention enables high lading and the like to be tied securely to the truck bed. The device 10 comprises, in a first embodiment shown in FIGS. 2 and 3, a first side portion 32 and a second side portion 34 interconnected at one end thereof by a section 36. The side portions 32, 34 and section 36 are preferably formed of a single piece of flat metal into substantially V-shape. The metal is chosen as one having the basic characteristics of spring steel in that the sides 32, 34 return to their set position after momentary deflection toward or away from each other. The other ends of the first and second side portions 32, 34 are bent outwardly a distance at a slight obtuse angle with respect thereto to form stop legs 38, 40 respectively. The stop legs 38, 40, as can be more clearly seen by referring to FIG. 8, engage the horizontally extending flange 22 to prevent further downward movement of the first and second side portions 32, 34 into stake opening 26. The stop leg 38 has an extension 42 formed at substantially right angles thereto to which a ring 44 can be secured through a recess 45. The ring 44 serves primarily as a means to which a rope 46 can be tied. The extension 42 could also have a hook secured thereto or the extension 42 itself could be shaped in the form of a hook to which a rope can be tied. The stop leg 40 also has an extension 48 which, in the embodiment of FIGS. 2 and 3, serves as an arm which can be grasped by the hand to force the extensions 42, 48 toward each other.

In order to prevent the device 10 from being removed from the stake opening 26 when in position, i.e.

the stop legs 38, 40 engage horizontally extending flange 22, projections 50, 52 are provided. The projection 50 is secured to the first side portion 32 perpendicular thereto and spaced from stop leg 38 such as by welding and the projection 52 is similarly secured to second side portion 34. As can be best seen by referring to FIG. 8, the projections 50, 52 engage the depending flanges 28, 30 respectively to thus prevent removal of the device 10 when tension is exerted on the ring 44. As can be seen, as the side portions 32, 34 are drawn toward each other by hand pressure exerted on the extensions 42, 48, the projections 50, 52 clear the depending flanges 28, 30 respectively and the tie-down device 10 can be easily removed from the stake opening 26.

Referring now to FIGS. 4 and 5, another embodiment of the tie-down device 10 is shown wherein no extension such as 42 is present and the extension 48 has a recess 54 through which a bolt 56 can pass. The bolt 56 can be used to secure the outer frame 58 of a camper, body top or the like. To insure adequate attachment of the frame 58 to the truck body, a number of tie-down devices 10 equal to the number of stake openings 26 would probably be required.

Referring to FIGS. 6 and 7 a further embodiment of the tie-down device 10 is shown wherein an extension 42 and ring 44 are provided for a tethering rope as in the embodiment of FIGS. 2 and 3 but in addition, the extension 48 has associated therewith a platform 60 with a recess 62 therethrough. The platform 60 and recess 62, can serve as a mounting means to which an antenna 64 of the conventional or citizen band type can be attached or, in like manner, a flag or similar object.

A tie-down device 10 has thus been disclosed which can be, with the exception of the projections 50, 52, easily formed by bending a single piece of metal to the configuration shown in the various embodiments. The simple yet unique device can thus be extensively used due to the fact that it is of relatively inexpensive construction and it can serve many functions as disclosed in the several embodiments. The device's operation is also simple yet effective and it is usable on virtually all pick-up trucks in past or current production.

The foregoing embodiments are to be considered illustrative only of the principles of the invention. Further, service numerous modifications and changes will readily occur to those skilled in the art, it is not desired to limit the invention to the exact construction and operation shown and described, and accordingly, all suitable modifications and equivalents may be resorted to falling within the scope of the invention.

What I claim is:

1. A device for use with a hollow sidewall of a bed of a pick-up truck having a stake opening through said sidewall, said device comprising:
    (a) first and second side portions joined at one end capable of being inserted in said stake opening,
    (b) a projection on each of said side portions, said projections extending a distance away from said side portions to engage said sidewall of said bed to prevent removal of said device from said stake hole, and
    (c) extension means associated with each of said first and second side portions to permit attachment of an object thereto.

2. A device as set forth in claim 1 further comprising first and second stop members formed on the other ends of said first and second side portions respectfully, said stop members extending away from said side portions to engage said sidewall of said bed to thereby limit the distance said side portions can be inserted in said stake hole.

3. A device as set forth in claim 2 wherein said first and second side portions and said first and second stop members are formed from a single piece of resilient metal.

4. A device as set forth in claim 1 wherein said extension means of said first side portion has an aperture therethrough for attaching an object thereto.

5. A device as set forth in claim 4 wherein said extension means of said second side portion has an aperture therethrough and a ring in said aperture to which a rope can be attached.

* * * * *